United States Patent [19]

Livingstone

[11] Patent Number: 5,000,723
[45] Date of Patent: Mar. 19, 1991

[54] UNIVERSAL JOINT FOR DOWNHOLE MOTORS

[75] Inventor: Ray Livingstone, Edmonton, Canada

[73] Assignee: Canadian Downhole Drill Systems Inc., Nisku, Canada

[21] Appl. No.: 341,486

[22] Filed: Apr. 21, 1989

[51] Int. Cl.⁵ .............................................. F16D 3/221
[52] U.S. Cl. .................................. 464/140; 464/141; 464/155
[58] Field of Search ................ 384/610; 464/139, 140, 464/141, 143, 906, 106, 152, 155

[56] References Cited

U.S. PATENT DOCUMENTS

| | | | |
|---|---|---|---|
| 1,463,306 | 7/1923 | Bushnell | 464/141 |
| 1,966,528 | 7/1934 | Stegeman et al. | 464/140 |
| 2,038,466 | 4/1936 | Yates | 464/140 X |
| 2,140,295 | 12/1938 | Mallard | 464/143 X |
| 2,795,398 | 6/1957 | Ragland | 464/141 X |
| 2,865,687 | 12/1958 | Bergmann | 384/610 X |
| 2,968,936 | 1/1961 | Croset | 464/141 |
| 3,153,920 | 10/1964 | Ireland | 464/140 |
| 3,187,635 | 6/1965 | Koss | 464/141 X |
| 4,768,993 | 9/1988 | Axelsson et al. | 464/139 X |

FOREIGN PATENT DOCUMENTS

| | | |
|---|---|---|
| 218738 | 3/1918 | Canada . |
| 327204 | 11/1932 | Canada . |
| 873111 | 7/1953 | Fed. Rep. of Germany ...... 384/610 |
| 2131519 | 6/1984 | United Kingdom ............... 464/141 |

Primary Examiner—Daniel P. Stodola
Attorney, Agent, or Firm—Anthony R. Lambert

[57] ABSTRACT

A rotor adapter for connection between a drive shaft having eccentric motion and a driven shaft having circular motion within a downhole mud motor. The rotor adapter has two symmetrical ends on either end of a rotor adapter shaft. Each end includes a coupler defining a socket for receiving one end of the rotor adapter shaft. A thrust ball is located between the rotor adapter shaft and the coupler and seated in pockets that have radii larger than the thrust ball and depths shallower than the radius of the thrust ball. Circumferentially spaced pockets around the rotor adapter shaft near the end of the shaft fit steel balls which protrude into complementary pockets on the coupler. The coupler pockets are cylindrical and plugged from the outside with plugs. The plugs are secured in place with the steel balls in the complementary pockets. The pockets on the rotor adapter shaft are elongated in the axial direction of the rotor adapter shaft to allow tilting of the rotor adapter shaft. The coupler and rotor adapter shaft ends are oppositely tapered away from the pockets to allow for tilting of the rotor adapter shaft.

5 Claims, 3 Drawing Sheets

UNIVERSAL JOINT FOR DOWNHOLE MOTORS

FIELD OF THE INVENTION

This invention relates generally to universal joints for connecting a drive shaft to a driven shaft and more particularly to a rotor adapter for connecting the eccentric motion of a downhole mud motor to the circular motion of a drilling shaft.

BACKGROUND OF THE INVENTION

Rotor adapters are used to connect the downhole end of a mud motor to the drive shaft which turns the drill bit. The downhole end of the mud motor rotates eccentrically. That is, the end of the mud motor is displaced from a central axis and rotates around it. The rotor adapter is used to convert the eccentric motion to circular motion in which the axis of the driven shaft remains in one place.

As particularly used in downhole drilling, the rotor adapter must sustain high thrust forces. In addition, because backing out of the hole is expensive, it is desirable that the rotor adapter be able to function under high stress for as long as possible.

In addition, the rotor adapter must be able to sustain the high torque required for drilling, preferably including the extreme torque experienced when the drill bit becomes stuck.

Previously, these requirements were met by a rotor adapter having a rotor adapter shaft with ball and socket joints on either end for connecting to the drive shaft and driven shaft. However, the ball and socket joints were torch cut from a single bar of metal and required considerable thickness to have the necessary strength for drilling.

Recent developments in downhole drilling have included the adoption of an adjustable bent housing which permits adjustment of the angle of drilling at the rig site without removing the bent housing and replacing it with another. However, the adoption of the adjustable bent housing has required that the rotor adapter shaft be thinner than that permitted by the strength limitations of the ball and socket rotor adapter.

Since previous rotor adapters, particularly the ball and socket rotor adapter, were not capable of being used with the adjustable bent housing, there has been a need to develop a new rotor adapter with universal joints which is strong, long wearing and relatively thin. Previous attempts to provide such a rotor adapter have included a device which rotated around two perpendicular axes on a central block. This device was unsatisfactory due to its poor strength. The present invention, by contrast, provides a strong and long wearing rotor adapter suitable for use with the adjustable bent housing.

SUMMARY OF THE INVENTION

The present invention satisfies these needs and in one embodiment provides a rotor adapter for coupling a drive shaft having eccentric motion to a driven shaft having circular motion, the rotor adapter being formed from a rotor adapter shaft having a longitudinal axis, and a universal joint disposed at each of the first and second ends of the rotor adapter shaft, each of the universal joints comprising:

a coupler adapted to be rigidly connected to one of the drive shaft and the driven shaft and having a longitudinal axis;

the coupler having an interior end wall and an interior circumferential wall defining a socket for loosely receiving a respective end of the rotor adapter shaft;

removable drive means circumferentially spaced around the rotor adapter shaft adjacent a respective end of the rotor adapter shaft for transmitting angular motion between the rotor adapter shaft and the coupler;

a plurality of circumferentially pockets formed in and circumferentially spaced around the rotor adapter shaft, each of the pockets being elongated in the axial direction of the rotor adapter shaft;

a plurality of recesses corresponding to the plurality of circumferential pockets and formed in and circumferentially spaced around the interior circumferential wall of the coupler;

the recesses being cylindrical and having axes radially disposed in relation to the rotor adapter shaft and extending through the coupler walls to form passages through the coupler;

a plurality of plugs threaded in the recesses and externally removable from the recesses;

a plurality of drive balls, each ball adapted to be snugly fitted in one of the plurality of circumferential pockets and one of the plurality of recesses;

a coupler pocket formed in the interior end wall of the coupler and centred on the longitudinal axis of the coupler, the coupler pocket having a radius of curvature greater than its depth;

a shaft pocket formed in the first end of the rotor adapter shaft and centred on the longitudinal axis of the rotor adapter shaft, the shaft pocket having a radius of curvature greater than its depth;

a thrust ball disposed between each of the coupler and the respective end of the rotor adapter shaft, the ball having a radius of curvature less than the radius of curvature of each of the coupler pocket and the shaft pocket and the diameter greater than the sum of the depths of the shaft pocket and coupler pocket; and the rotor adapter shaft being transversely thickened at the circumferential pockets and tapering away from the circumferential pockets; and the interior circumferential wall of the coupler being internally thickened towards the recesses and tapering away from the recesses.

Further embodiments are shown in the claims forming a part of this patent.

BRIEF DESCRIPTION OF THE DRAWINGS

A description of a preferred embodiment of the invention will now be made for the purpose of illustrating the invention and with reference to the Figures, in which.

DETAILED DESCRIPTION OF THE PREFERRED EMBODIMENT

Figure 1:
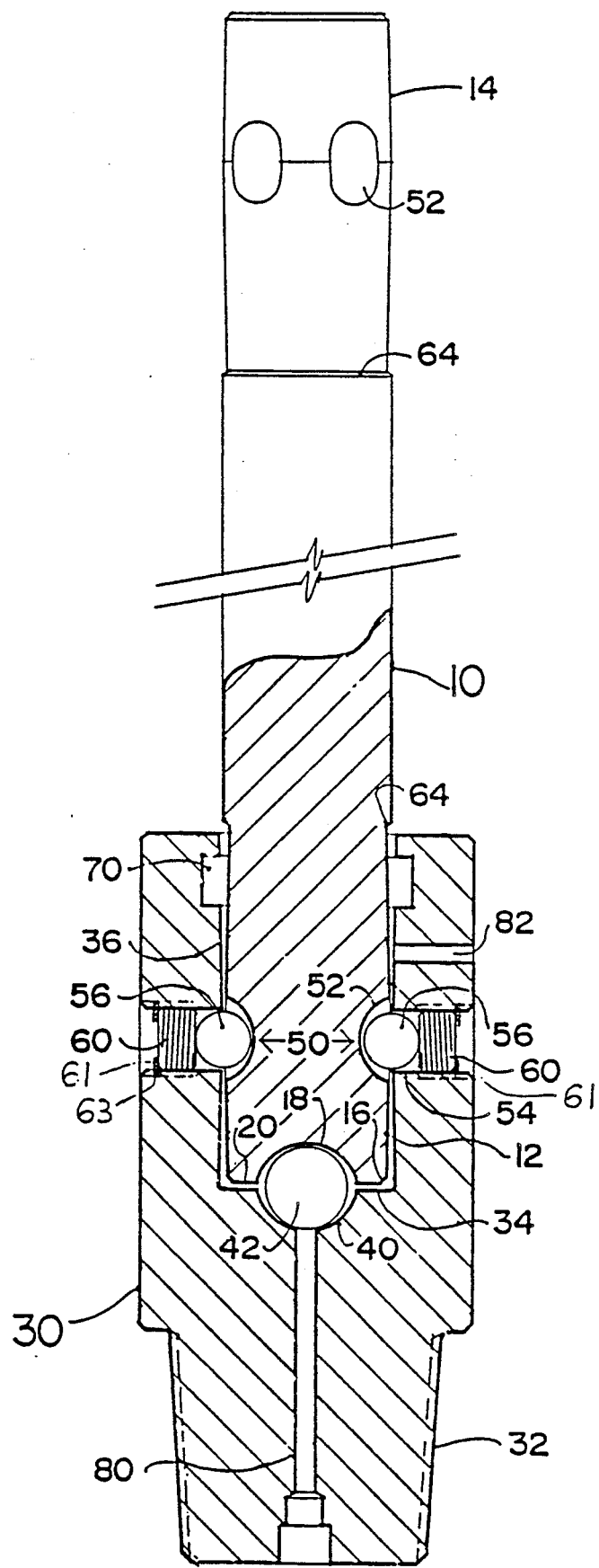
FIG. 1 is a cross-section through one end of an assembled rotor adapter according to the invention.
Figure 2:
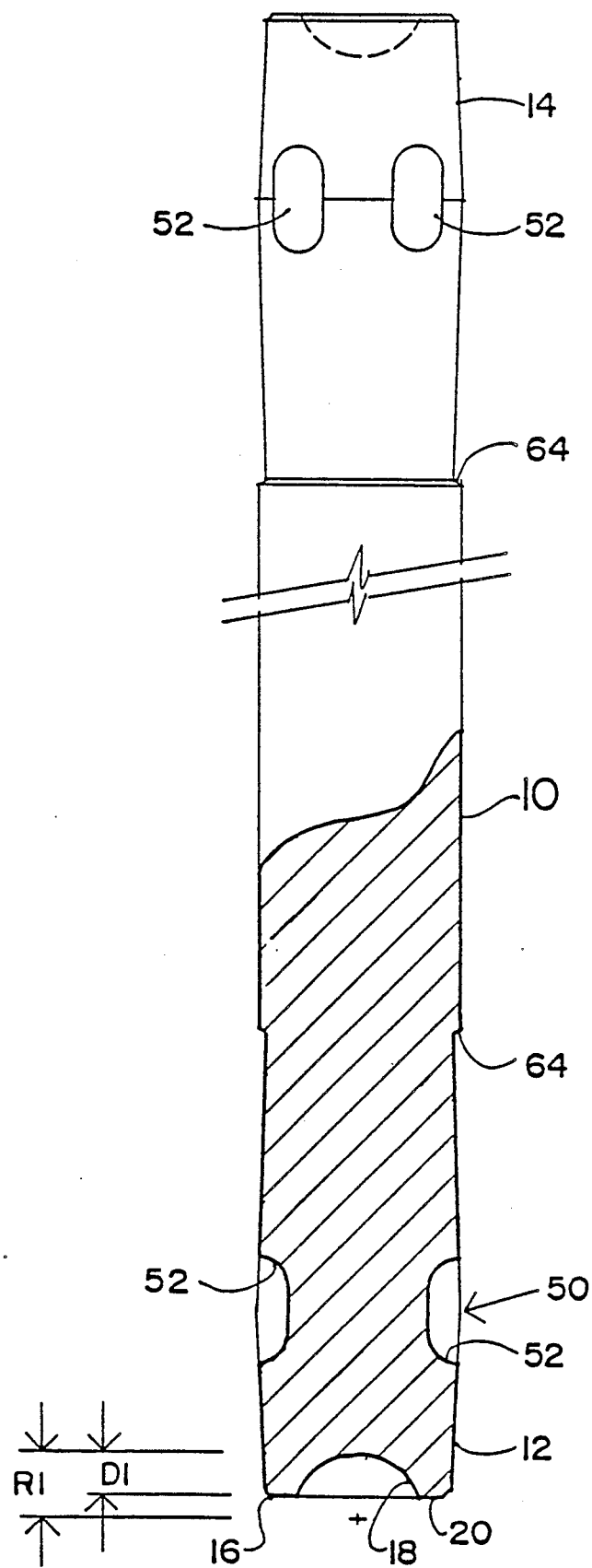
FIG. 2 is a cross-section of a rotor adapter shaft according to the invention.

Referring to FIGS. 1 and 2, the rotor adapter shaft 10 is a solid bar of steel, preferably made of ASTRALLOY-V TM brand steel available from Astralloy Wear Technology in Birmingham, AL, U.S.A. (Astralloy-V is a trade mark of Astralloy Wear Technology). The thickness and length of rotor adapter shaft 10 will be chosen according to the intended application, but will be about 2.25" in diameter and 19.25" long for a 6¾" downhole tool. Ends 12 and 14 are symmetrical to each other. End 12 will be described but it will be understood that end 14 has the same construction, except that its features are rotationally offset from equivalent features of end 12.

Pocket 18 is formed in the extreme end 16 of rotor adapter shaft 10 and symmetrically disposed on the longitudinal axis of rotor adapter shaft 10. Pocket 18 has a spherical surface with a radius $R_1$ greater than its depth $D_1$ so that the inner surface constitutes less than a semisphere. The steel around the pocket 18 as shown for example at 20 is under high stress in use and consequently must be sufficiently thick to withstand that stress.

Figure 3:
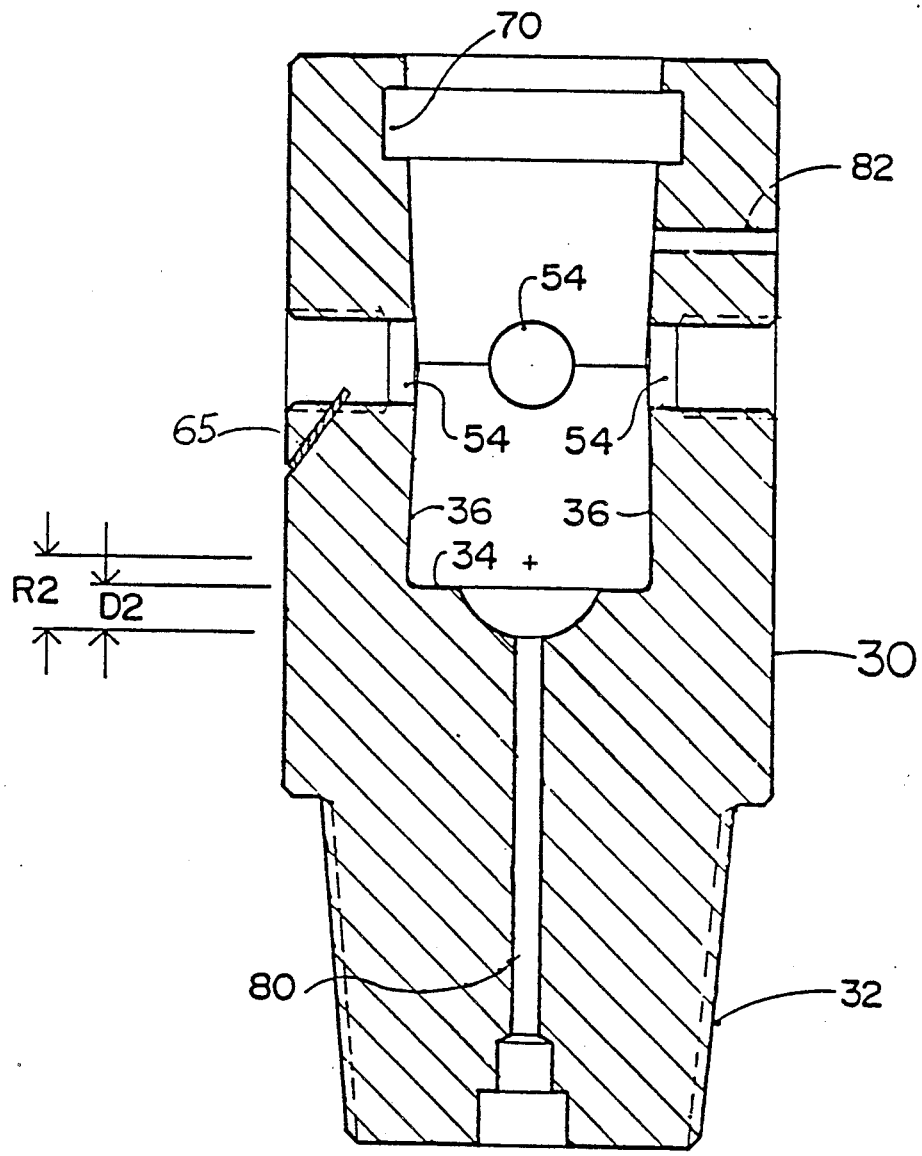
FIG. 3 is a cross-section of a coupler according to the invention for connection between a rotor adapter shaft and the drive shaft and driven shaft.

Referring to FIGS. 1 and 3, coupler 30 is made of one piece of steel, preferably Astralloy-V TM brand. End 32 of coupler 30 is threaded for attachment to one of either the drive shaft of a downhole mud motor (not shown) or the driven shaft connected to the drill bit (not shown). Interior end wall 34 and interior circumferential wall 36 define a socket for loosely fitting the end 12 of rotor adapter shaft 10. A similar coupler (not shown) is used at end 14 of rotor adapter shaft 10 for connection to the other of the drive shaft of the downhole mud motor or the driven shaft connected to the drill bit. The clearance between coupler 30 and rotor adapter shaft 10 should be sufficient to allow the side-to-side motion of the rotor adapter shaft 10 in the coupler 30 resulting from the eccentric motion of the drive shaft in relation to the driven shaft.

Pocket 40 is similar to pocket 18 in extreme end 16 of rotor adapter shaft 10. It must be symmetrically disposed on the longitudinal axis of the coupler 30. Its radius $R_2$ is greater than its depth $D_2$. In use, a thrust ball 42, having radius less than the radius $R_1$ and the radius $R_2$ of the pockets 18 and 40 respectively, is placed in pockets 18 and 40. To prevent rotor adapter shaft 10 from grinding against the interior end wall 34, the diameter of the thrust bearing 42 must be greater than the sum of the depth $D_1$ and depth $D_2$ of the pockets 18 and 40 respectively. The actual clearance required between interior end wall 34 and extreme end 12 of rotor adapter shaft 10 depends on the eccentricity of the motion of the downhole mud motor, but is clearly variable.

Thrust ball 42 should be sufficiently large to withstand the downhole thrust stresses of a drill string, but cannot be so large that the steel surrounding the pockets is thinned so much that it is no longer capable of withstanding downhole stresses. For a 19.25" rotor adapter shaft 10, with expected eccentric motion of 9/16"0 (defined in relation to the deviation from the central axis), and a rotor adapter shaft having a diameter of 2.25", the thrust ball 42 will preferably have a diameter of 1.25", the pockets 18 and 40 will preferably have a radius $R_1$ and radius $R_2$ each of 0.687" and depth $D_1$ and depth $D_2$ each of 0.50".

The thrust ball 42 transmits axial thrust forces. Drive means for transmitting angular motion through the rotor adapter is shown located on the rotor adapter shaft 10 at 50. The drive means includes a plurality of pockets 52 formed in and circumferentially spaced around the rotor adapter shaft 10 adjacent the extreme end 12. Each of the pockets 52 is circular in cross-section perpendicular to the axis of the rotor adapter shaft 10 and elongated in the direction of the axis of the rotor adapter shaft 10. Four pockets 52 are shown, but the number may be varied depending on the torque requirements and size of the rotor adapter shaft 10. Complementary pockets or recesses 54 are formed in and circumferentially spaced around the interior circumferential wall 36 of the coupler 30.

The pockets 54 are preferably cylindrical and passed through the coupler 30 to the exterior of the coupler 30. Steel balls 56 are adapted to fit snugly in pockets 52 and 54. The pockets 52 are sufficiently elongated to allow the steel balls 56 to roll axially in relation to the rotor adapter shaft 10 as the rotor adapter shaft 10 tilts as a result of the eccentric motion of the drive shaft.

As shown, the pockets 52 and 54 have radius of approximately 0.437", the pockets 52 have length about 1.12", and the steel balls 56 are chosen accordingly to fit snugly within the pockets. The steel balls should be chosen to withstand the usual downhole stresses.

Pockets 54 are internally threaded and receive cylindrical plugs 60 which are externally threaded. The plugs 60 may, for example, be ¾" pipe plugs available from National Pipe.

In use, end 12 of rotor adapter shaft 10 is placed in coupler 30 with thrust ball 42 disposed between them. Steel balls 56 are placed in the complementary pockets 52 and 54. Plugs 60 are tightened on to the steel balls 56. The plug 60 should be secured in place, for example by snap rings 61 snapped into an annular recess 63 near the outer edge of each pocket 54, or by pins 65 drilled into the plugs 60 through the material of the coupler 30 surrounding the pockets 54. The plugs 60 may be indented at one end to receive the steel balls 56.

Removal of the plugs 60 permits the balls 56 to be readily removed externally and the rotor adapter shaft 10 released from the socket of the coupler 30. The extension of the effective diameter of the rotor adapter shaft 10 and the drive means at 50 by tilting of the rotor adapter shaft 10 in relation to the coupler 30 (resulting from the eccentric motion of that drive shaft) causes compression of the steel balls 56, the plugs 60 and the steel around the pockets 52 but this is not believed to be a serious problem because the change in length is small.

Rotor adapter shaft 10 is preferably thickened at the drive means at 50, and tapered away from the drive means. Greater thickness at 50 provides greater strength at a highly stressed part of the rotor adapter shaft 10 while allowing the required play between end 12 and coupler 30. As shown in FIG. 1, the drive means at 50 is centred 1.75" from the end 12 of the rotor adapter shaft 10 and the taper is approximately 0.113" towards end 12. In the other direction, the taper is 3.25" long and the change in diameter is approximately 0.17" (resulting in shoulder 64). The taper allows additional clearance while maintaining a thick central stressed section of the rotor adapter shaft 10. The taper should not be so great as to thin unduly the steel surrounding the pocket 18 at 20 or the rotor adapter shaft 10 in the direction of end 14, and preferably should be less than 5° in each direction.

Coupler 30 is reverse tapered as compared with the rotor adapter shaft 10 about the location of the drive means at 50. In the direction of the interior end wall 34, the taper shown is 0.113" over 1.937". If the taper is too great, over about 5°, the interior circumferential wall 36 of coupler 30 is unnecessarily weakened. In the direction of the end 14, the taper is about 0.175" over 3.00". This tapering allows further play without reducing the thickness of the rotor adapter shaft 10.

Annular groove 70 houses a seal ring (not shown) which seals in lubrication. Holes 80 and 82 allow grease to be introduced to the coupler 30 after sealing, and are sealed by plugs (not shown) after introduction of the lubrication.

The other end 14 of rotor adapter shaft 10 is constructed in the same manner as end 12. A coupler, identical to coupler 30, is also employed and adapted for connection to the other of the drive shaft and the driven shaft. Preferably the pockets 52 and 54 of end 12 are symmetrically offset from the equivalent pockets of end 14. This tends to even out the stresses experienced by the steel balls 56.

To assemble the rotor adapter, end 12 of rotor adapter shaft 10 is placed in the socket of coupler 30 with complementary pockets 52 and 54 facing each other. Steel balls 56 are placed in the pockets 52 and 54 from outside the coupler 30. Plugs 60 are screwed into pockets 54 and secured in place by snap rings 61 or pins 63.

Skilled persons will readily conceive of immaterial variations on the preferred embodiment shown here, and such immaterial variations are intended to be covered by the scope of the claims that follow.

I claim:

1. A rotor adapter for coupling a drive shaft of a downhole mud motor having eccentric motion to a driven shaft having circular motion, the rotor adapter being formed from a rotor adapter shaft having a longitudinal axis and first and second ends, and a universal joint disposed at each of the first and second ends of the rotor adapter shaft, each of the universal joints comprising:

a coupler adapted to be rigidly connected to one of the drive shaft and the driven shaft and having a longitudinal axis;

the coupler having an interior end wall and an interior circumferential wall defining a socket for loosely receiving a respective end of the rotor adapter shaft;

removable drive means circumferentially spaced around the rotor adapter shaft adjacent a respective end of the rotor adapter shaft for transmitting angular motion between the rotor adapter shaft and the coupler;

a plurality of circumferential pockets formed in and circumferentially spaced around the rotor adapter shaft, each of the pockets being elongated in the axial direction of the rotor adapter shaft;

a plurality of recesses corresponding to the plurality of circumferential pockets and formed in and circumferentially spaced around the interior circumferential wall of the coupler;

the recesses being cylindrical and having axes radially disposed in relation to the rotor adapter shaft and extending through the coupler walls to form passages through the coupler;

a plurality of plugs threaded in the recesses and externally removable from the recesses;

said drive means comprising a plurality of drive balls, each ball adapted to be snugly fitted in one of the plurality of circumferential pockets and one of the plurality of recesses;

a coupler pocket formed in the interior end wall of the coupler and centred on the longitudinal axis of the coupler, the coupler pocket having a radius of curvature greater than its depth;

a shaft pocket formed in the respective end of the rotor adapter shaft and centred on the longitudinal axis of the rotor adapter shaft, the shaft pocket having a radius of curvature greater than its depth;

a thrust ball disposed between each of the coupler and the respective end of the rotor adapter shaft, the ball having a radius of curvature less than the radius of curvature of each of the coupler pocket and the shaft pocket and the diameter greater than the sum of the depths of the shaft pocket and coupler pocket;

the rotor adapter shaft being radially thickened at the circumferential pockets and tapering away from the circumferential pockets; and the interior circumferential wall of the coupler being internally thickened towards the recesses and tapering away from the recesses.

2. The rotor adapter of claim 1 in which the recesses include annular grooves and in which the plugs are secured in the recesses by snap rings inserted into the annular grooves.

3. The rotor adapter of claim 1 or 2 in which the rotor adapter shaft tapers away from the circumferential pockets at an angle of less than 5° and the interior circumferential wall of the coupler tapers away from the recesses at an angle of less than 5°.

4. The rotor adapter of claim 1 in which the plugs are secured in the recesses by pins drilled through the coupler into the plugs.

5. The rotor adapter of claim 4 in which the rotor adapter shaft tapers away from the circumferential pockets at an angle of less than 5° and the interior circumferential wall of the coupler tapers away from the recesses at an angle of less than 5°.

* * * * *